(12) United States Patent
Chang

(10) Patent No.: US 6,569,008 B1
(45) Date of Patent: May 27, 2003

(54) NETWORK FOR AN OIL-SMOKE EXHAUSTING DEVICE

(76) Inventor: Li-Lin Chang, No. 42, Mi Chih Road, Ching Shui Chen, Taichung Hsien (TW)

( * ) Notice: Subject to any disclaimer, the term of this patent is extended or adjusted under 35 U.S.C. 154(b) by 0 days.

(21) Appl. No.: 10/259,590

(22) Filed: Sep. 30, 2002

(51) Int. Cl.⁷ .............................................. B08B 15/02
(52) U.S. Cl. ........................ 454/67; 55/429; 126/299 F
(58) Field of Search ............................ 454/67, 65, 56; 126/299 F, 299 R, 299 D; 55/429

(56) References Cited

U.S. PATENT DOCUMENTS

| | | | | |
|---|---|---|---|---|
| 2,494,146 A | * | 1/1950 | Spanos | 55/429 |
| 5,307,538 A | * | 5/1994 | Rench et al. | 15/352 |
| 5,450,835 A | * | 9/1995 | Wagner | 123/573 |
| 5,807,415 A | * | 9/1998 | Leo | 55/385.3 |
| 5,890,484 A | * | 4/1999 | Yamada | 126/299 R |
| 6,216,686 B1 | * | 4/2001 | Chiu | 126/299 R |

* cited by examiner

*Primary Examiner*—Ira S. Lazarus
*Assistant Examiner*—Derek Boles
(74) *Attorney, Agent, or Firm*—Rosenberg, Klein & Lee

(57) ABSTRACT

A network for an oil-smoke exhausting device includes multiple cone-shaped nets separately piled up to one another and adapted to be mounted under an inlet of the oil-smoke exhausting device. Each net has a close end and an open end. The close end has a diameter smaller than that of the open end and the open end is adapted to be mounted around an inlet of the oil-smoke exhausting device. A flange radially outwardly extends from the open end of each of the nets and abuts one another. A washer is mounted between each two adjacent nets to form a chamber between each two adjacent nets. A fastening member securely extends through the cone-shaped nets and the wash ers to hold the washers in place. A frame is mounted around the open ends of each of the cone-shaped nets to combine the flanges securely abutting one another.

16 Claims, 10 Drawing Sheets

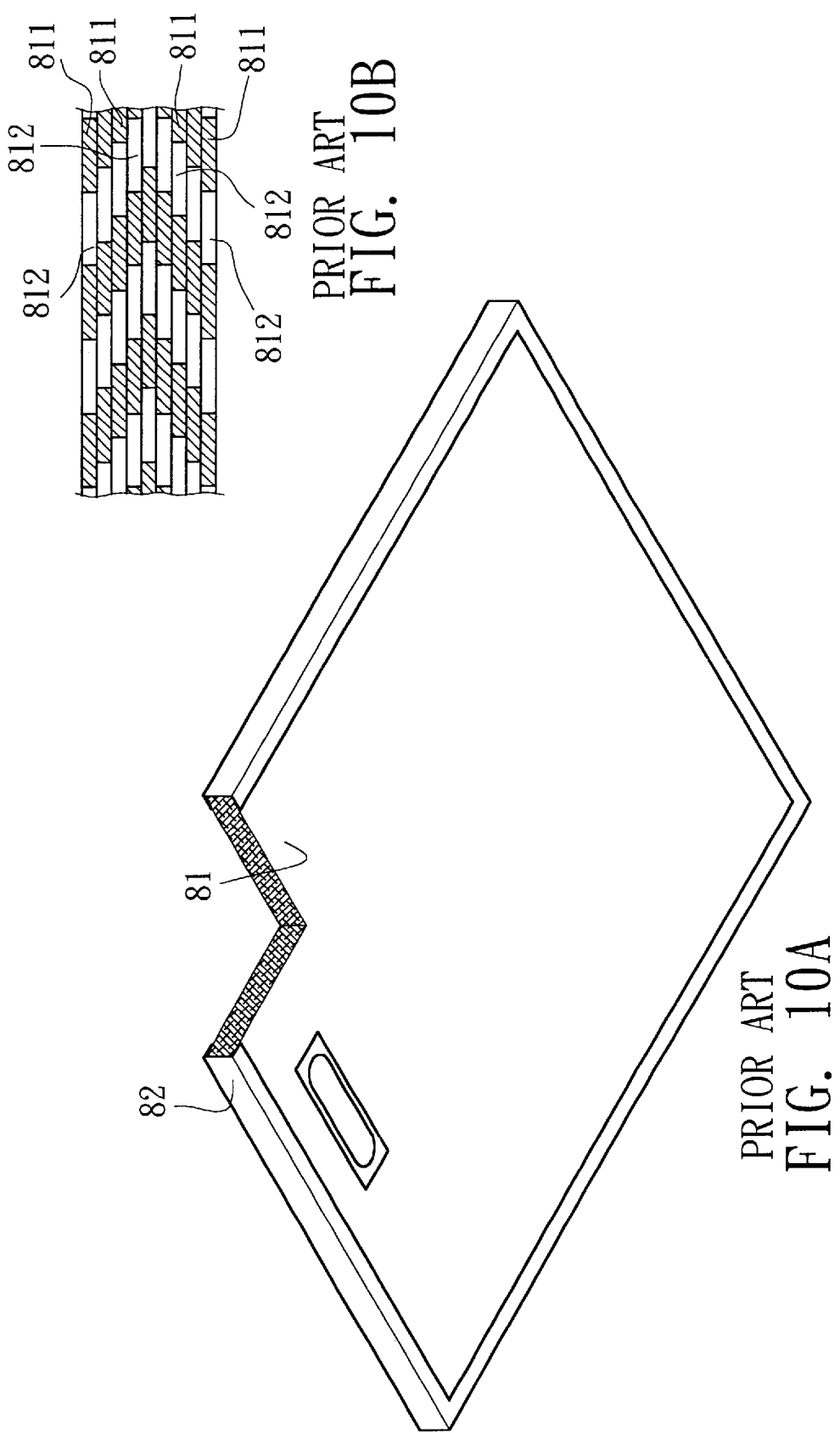
PRIOR ART FIG. 10B
PRIOR ART FIG. 10A

NETWORK FOR AN OIL-SMOKE EXHAUSTING DEVICE

BACKGROUND OF THE IN INVENTION

1. Field of the Invention

The present invention relates to a network, and more particularly to a network for an oil-smoke exhausting device.

2. Description of Related Art

A conventional network in accordance with the prior art shown in FIG. 8 is attached to an oil-smoke exhausting device near a ventilator (92) and corresponding to an inlet (93) of the oil-smoke exhausting device. The network comprises at least one cone-shaped rack (91) inversely mounted under the ventilator (92) and a cone-shaped net (911) inversely fixed in the cone-shaped rack (91) for resisting oil-smoke during cooking. The rack (91) includes a collector (94) attached to a loser end of the rack (91) for receiving the condensed oil-smoke.

However, there is only little oil-smoke cohered on the convention such that most oil-smoke is cohered on the oil-smoke exhausting device even exhausted into the atmosphere. As a result, not only the using life of the oil-smoke exhausting device is reduced but also the environment is polluted. Furthermore, the conventional net (911) needs to be replaced after using for a long time because the conventional net (911) is usually made as a thin structure and cannot be cleaned.

With reference to FIG. 9, it is an embodiment of an oil-smoke exhausting device (8) with another conventional network for an oil-smoke exhausting device. The oil-smoke exhausting device comprises multiple networks (81) mounted on a bottom of the oil-smoke exhausting device (8) to close an inlet (83) of the oil-smoke exhausting device (8). With reference to FIGS. 10A and 10B, each network (81) includes multiple nets (811) piled up to one another and a frame (82) mounted around the multiple nets (811) for combining the multiple nets (811) together and form the network (81). Most of the oil-smoke is cohered on the network (81) when the oil-smoke exhausting device is operated during cooking.

However, the above-mentioned oil-smoke exhausting device does not have any collecting element so that the network (81) frequently needs to be cleaned. It is an inconvenient design.

Furthermore, the nets (811) is piled up to form the network so that a passage (not numbered) in the network (81) defined by meshes of the multiple nets (811) is getting more and more smaller due to the number of the nets (811) and the exhausting volume is reduced. For promoting the exhausting effect, a large net is necessary to the above-mentioned oil-smoke exhausting device. However, a large network is difficult to clean.

As described above, the conventional network for an oil-smoke exhausting device needs to be advantageously altered and the present invention has arisen to mitigate and/or obviate the disadvantages of the two above-mentioned conventional networks for an oil-smoke exhausting device.

SUMMARY OF THE INVENTION

The main objective of the present invention is to provide an improved network for an oil-smoke exhausting device.

To achieve the objective, network in accordance with the present invention comprises multiple cone-shaped nets separately piled up to one another and adapted to be mounted under an inlet of the oil-smoke exhausting device. Each net has a close end and an open end. The close end has a diameter smaller than that of the open end and the open end is adapted to be mounted around an inlet of the oil-smoke exhausting device. A flange radially outwardly extends from the open end of each of the nets and abuts one another. A washer is mounted between each two adjacent nets to form a chamber between each two adjacent nets. A fastening member securely extends through the cone-shaped nets and the washers to hold the washers in place. A frame is mounted around the open ends of each of the cone-shaped nets to combine the flanges securely abutting one another.

More oil-smoke particle adheres on the network than that on the conventional network because the present invention has multiple nets that are separated to one another. Consequently, the exhausting volume will not be reduced.

Further benefits and advantages of the present invention will become apparent after a careful reading of the detailed description with appropriate reference to the accompanying drawings.

BRIEF DESCRIPTION OF THE DRAWINGS

FIG. 10A is a perspective view of the network in partial section in FIG. 9; and

FIG. 10B is a partial enlarged cross-sectional view of the network in FIG. 9.

DETAILED DESCRIPTION OF THE INVENTION

Figure 1:
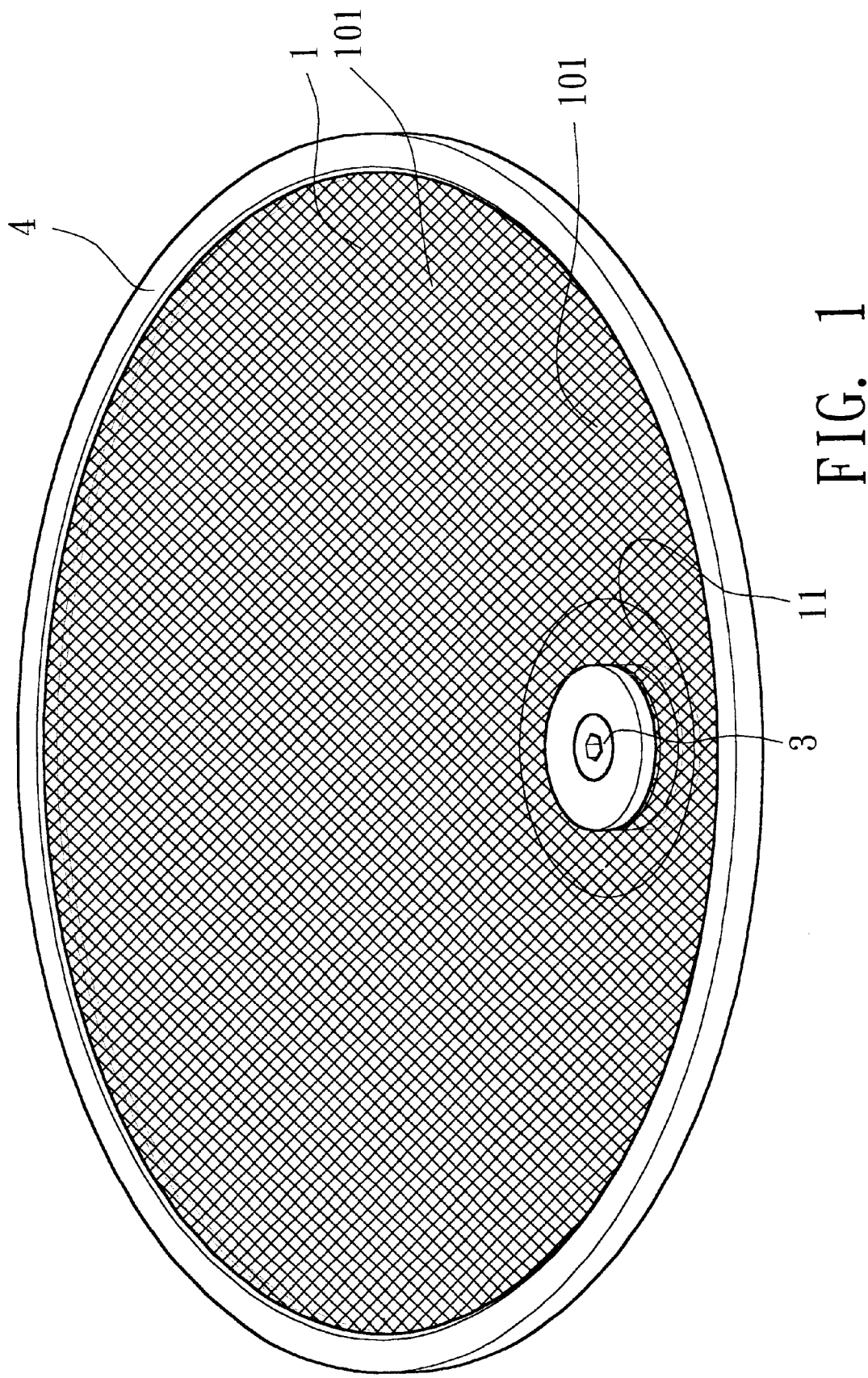
FIG. 1 is a perspective view of a network for an oil-smoke exhausting in accordance with the present invention.
Figure 2:
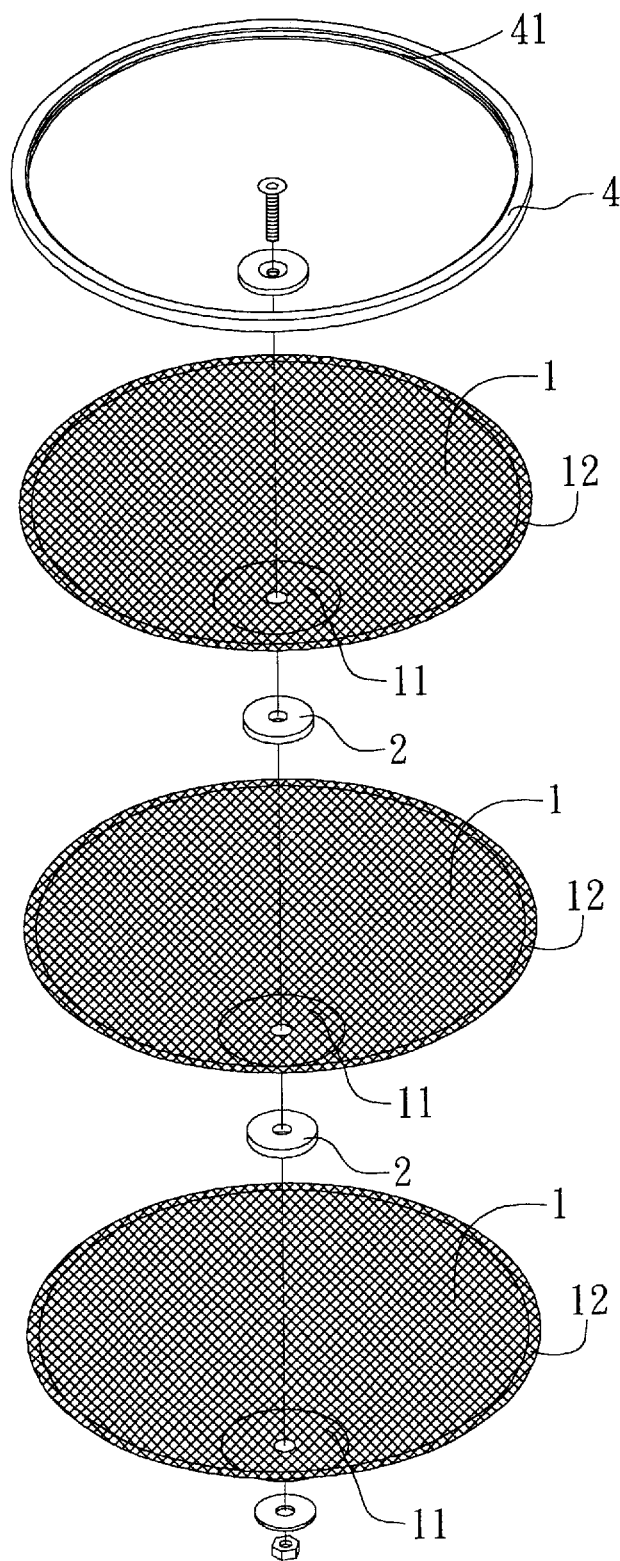
FIG. 2 is an exploded perspective view of the network in FIG. 1.
Figure 3:
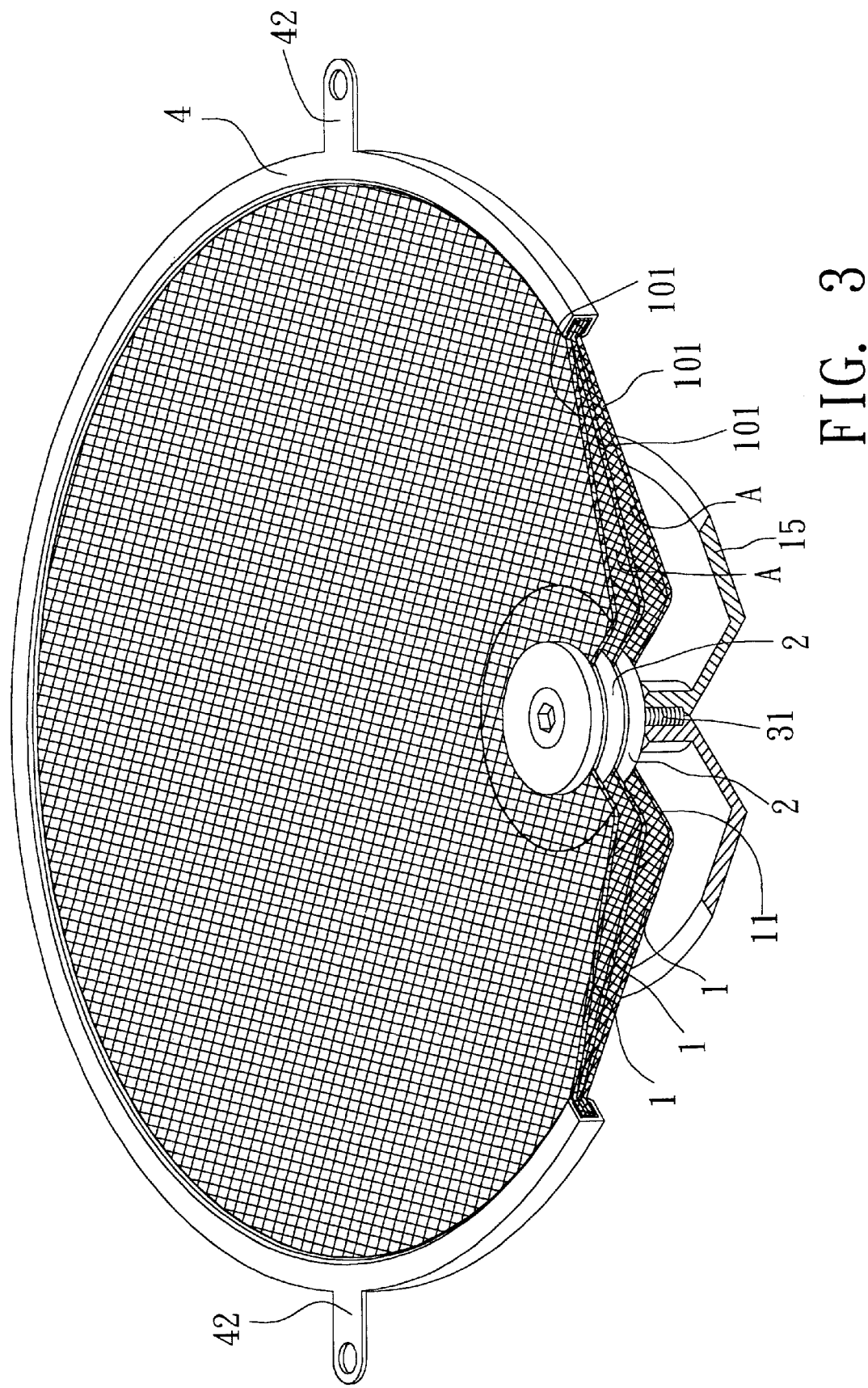
FIG. 3 is a perspective view in partial cross-section of the network in FIG. 1.
Figure 4:
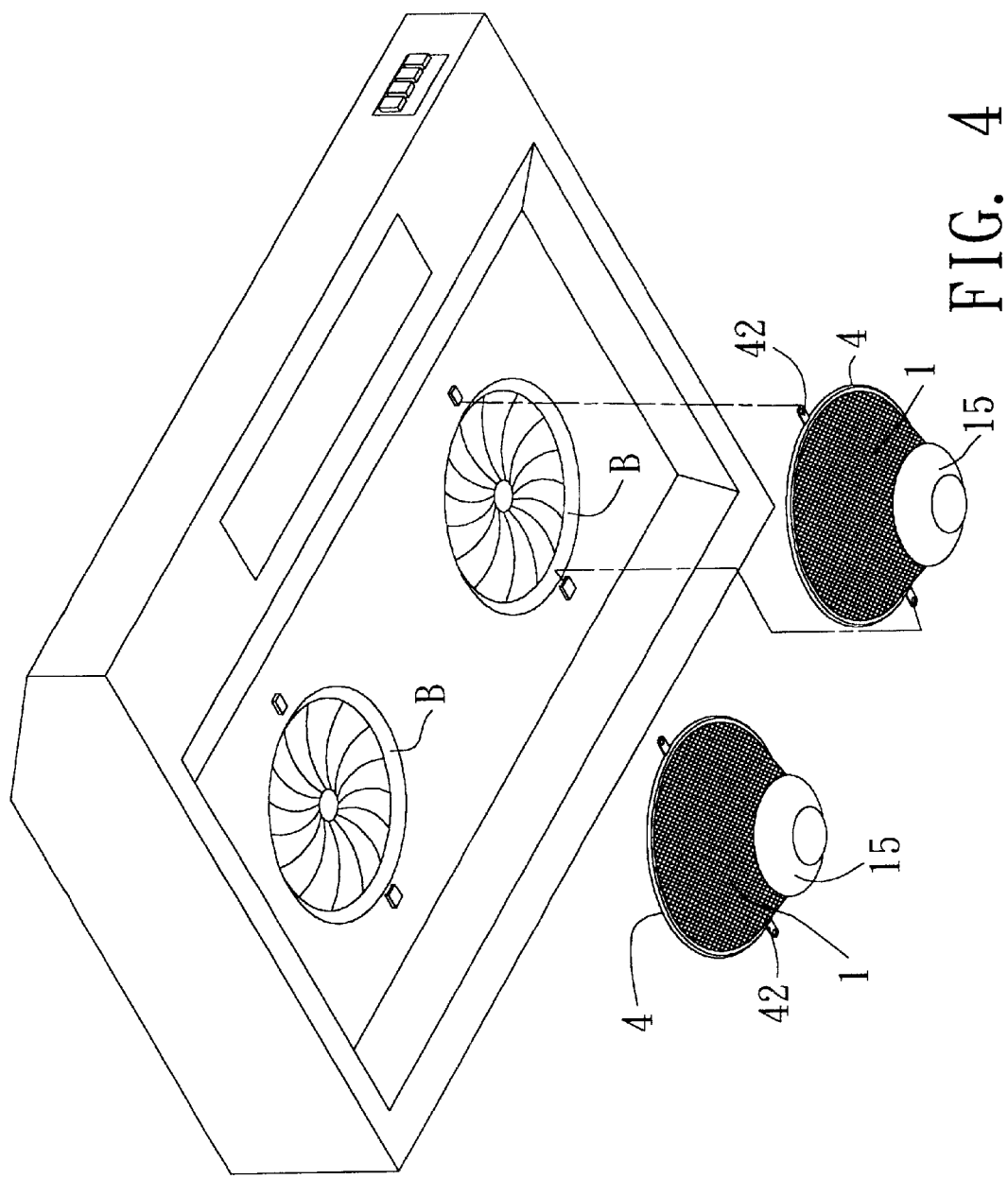
FIG. 4 is a schematic view of the network in FIG. 1.
Figure 5:
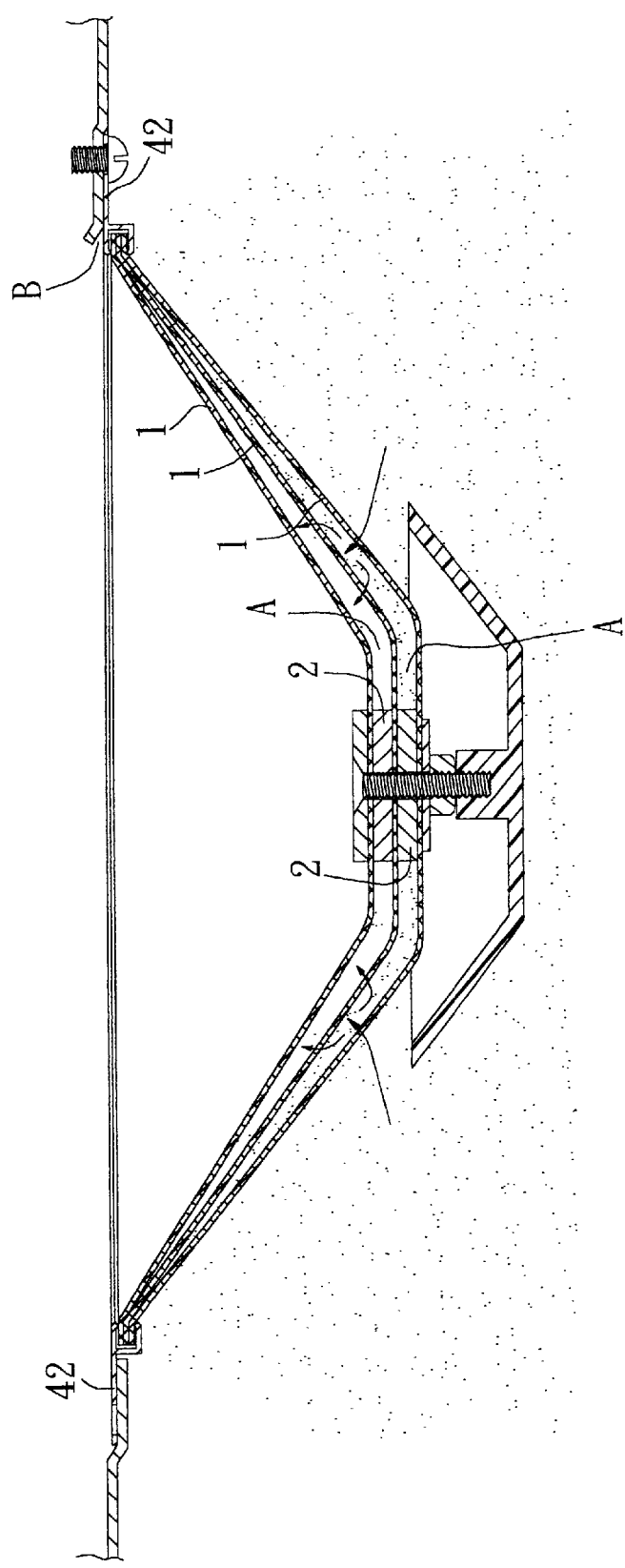
FIG. 5 is an operational front plan sectional view of the network in FIG. 1.

Referring to the drawings and initially to FIGS. 1, 2 and 3, a network for an oil-smoke exhausting device in accordance with the present invention comprises multiple cone-shaped nets (1) with series of meshes (101) piled up to one another and provided for the filtering oil particle to adhere on the network during cooking. In the preferred embodiment of the present invention, the network has three nets (1) and each net (1) has an open end and a close end. The open end of the net (1) has a diameter greater than that of the close end and the open end of the net (1) is adapted to be mounted around an inlet (B) of the oil-smoke exhausting device. Each net (1) has a platform (11) formed on the close end of the net and an annular cone portion (100) extending from the platform (11) of the net (1). The platforms (11) of each of the nets (1) has a diameter gradually reduced related to the oil-smoke exhausting device and the cone portions (100) of each of the nets (1) has a length gradually reduced related to the oil-smoke exhausting device. Each net (1) has an annular flange (12) radially extending from the open end of the net (1) and abutting one another. A frame (4) fixedly mounted around the flanges (12) of each of the nets (1) to combine the nets (1) together. The frame (4) has an annular groove (41) defined to securely receive the flanges (12) of each of the net (1). A washer (2) is centrally mounted between each two adjacent nets (1) and aligning with the close end of each of the nets (10) so that a chamber (A) is formed between each two adjacent nets (1). A fastening member (3) centrally and downward extends through the network and the washer (2). In the preferred embodiment of the present invention, the fastening member (3) is a screw and a collector (15) is attached to a free end of the fastening member (3) for collecting the congealed oil-smoke. The frame (4) has two ears (42) radially outwardly extending from the frame (4) and diametrically corresponding to each other. With reference to FIGS. 4 and 5, the network of the present invention can be mounted to the oil-smoke exhausting device by screws (not numbered).

Figure 6:
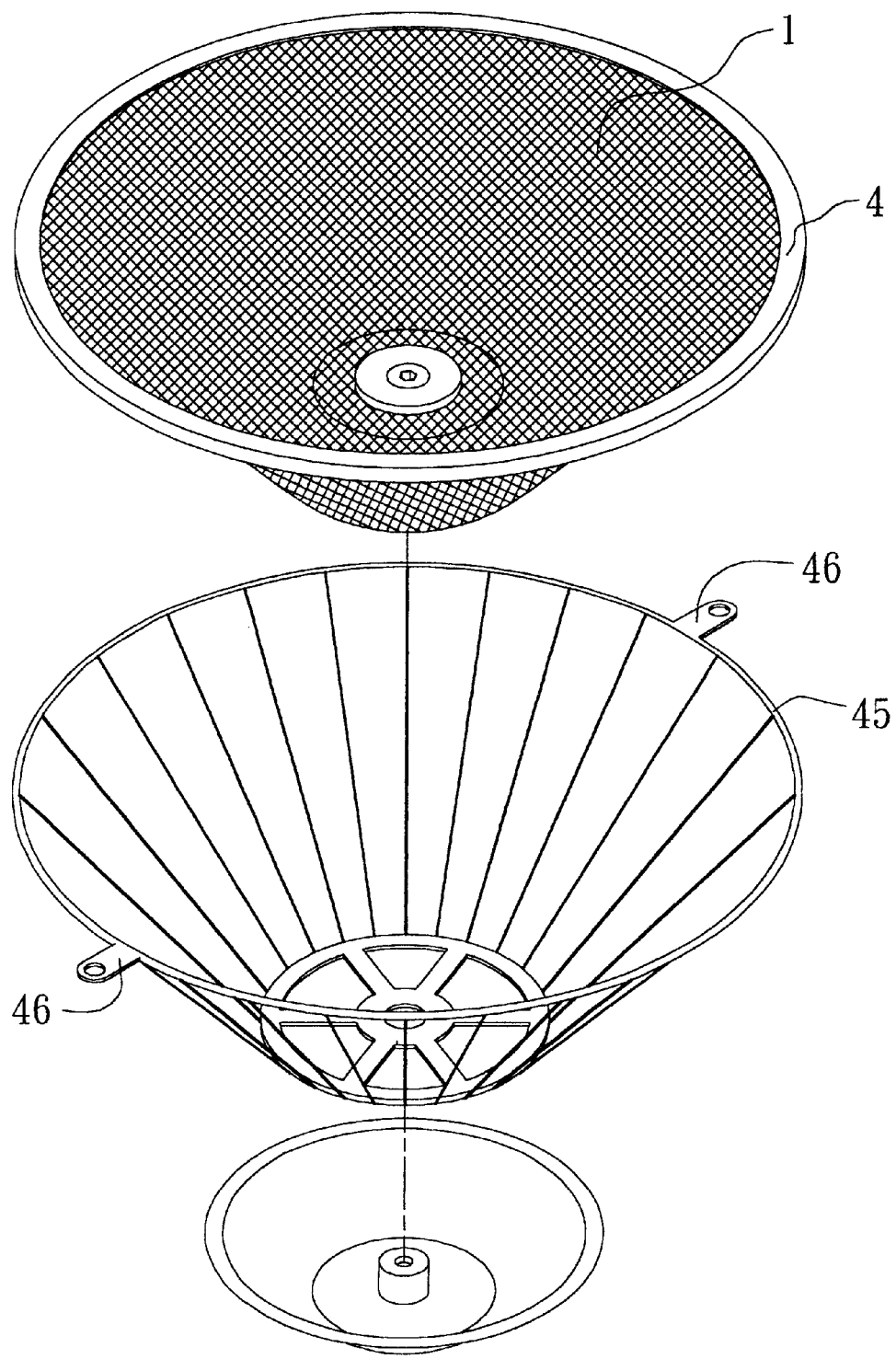
FIG. 6 is a partially exploded perspective view of another embodiment of a network for an oil-smoke exhausting device in accordance with the present invention.
Figure 7:
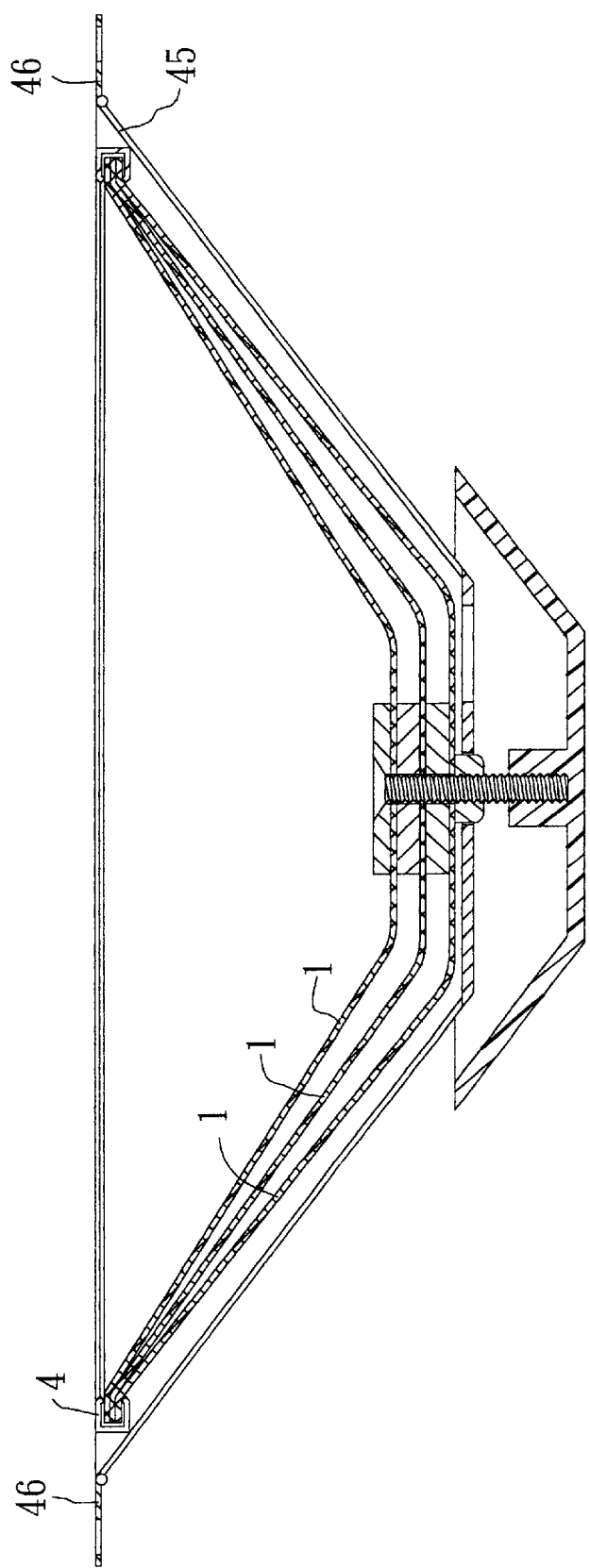
FIG. 7 is an operational front plan sectional view of the network in FIG. 6.
Figure 8:
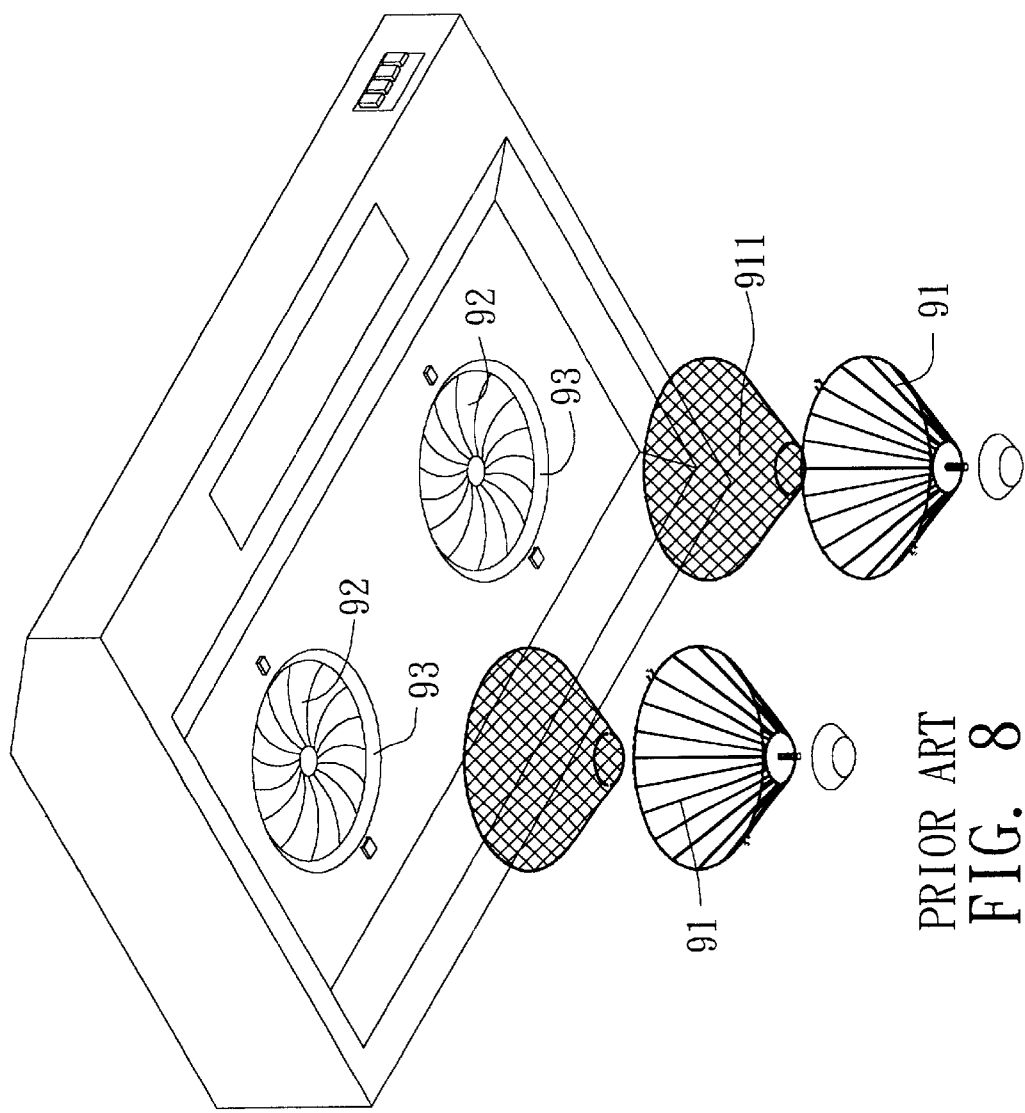
FIG. 8 is an exploded schematic perspective view of a network for an oil-smoke exhausting device in accordance with the prior art.
Figure 9:
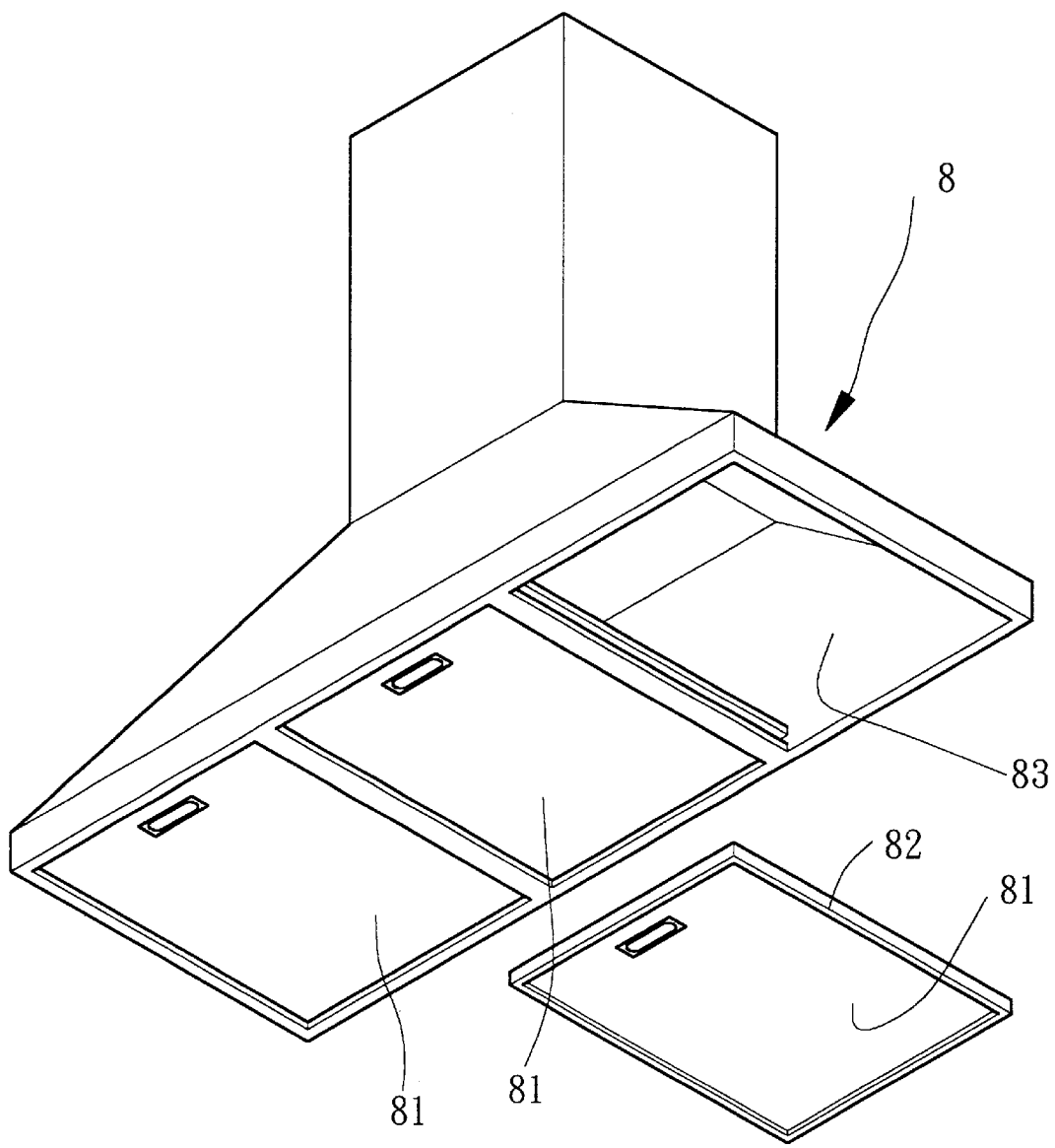
FIG. 9 is an exploded schematic perspective view of another network for an oil-smoke exhausting device in accordance with the prior art.

With reference to FIGS. 6 and 7, it is another embodiment of the present invention, wherein the network in accordance with the present invention further comprises a rack (45) mounted around the inlet (B) for supporting the network. The rack (45) has a shape corresponds to that of the network. The rack (45) has two ears (46) radially outwardly extending from the rack (45) near the frame (4) for mounting the network to the oil-smoke exhausting device.

With reference to FIG. 5, the nets (1) are separated to one another due to the chamber (A) so that the oil-smoke can easily pass through the meshes (101) of the nets (1) of the network and adhere on the nets (1). More oil-smoke particle adheres on the network than that on the conventional network because the present invention has multiple nets that are separated to one another. Consequently, the exhausting volume will not be reduced.

As described above, the network of the present invention can solve the problems of the conventional network and the congealed oil-smoke will flow into the collector (15) due to the shape of the network such that the user only needs to clean the collector (15). Consequently, the network in accordance with the present invention is a convenient design for an oil-smoke exhausting device.

Although the invention has been explained in relation to its preferred embodiment, it is to be understood that many other possible modifications and variations can be made without departing from the spirit and scope of the invention as hereinafter claimed.

What is claimed is:

1. A network for an oil-smoke exhausting device, comprising:

multiple cone-shaped nets separately piled up to one another and adapted to be mounted under an inlet of the oil-smoke exhausting device, each cone-shaped net having a close end and an open end, the close end having a diameter smaller than that of the open end and the open end adapted to be mounted around an inlet of the oil-smoke exhausting device, a flange radially outwardly extending from the open end of each of the cone-shaped nets, the flanges abutting one another;

a washer mounted between each two adjacent nets to form a chamber between each two adjacent nets, the washer aligning with the close end of each of the cone-shaped nets;

a fastening member securely extending through the cone-shaped nets and the washers to hold the washers in place; and a frame mounted around the open ends of each of the cone-shaped nets to combine the flanges securely abutting one another;

whereby the multiple cone-shaped nets are provide to adhere oil-smoke particle during cooking.

2. The network as claimed in claim 1, wherein the frame comprises an annular groove defined in the frame to securely receive the flanges of each of the cone-shaped nets.

3. The network as claimed in claim 1, wherein the frame comprises two ears radially outwardly extending from the frame and diametrically corresponding to each other such that the network is adapted to be mounted under the inlet of the oil-smoke exhausting device by screws.

4. The network as claimed in claim 2, wherein the frame comprises two ears radially outwardly extending from the frame and diametrically corresponding to each other such that the network is adapted to be mounted under the inlet of the oil-smoke exhausting device by screws.

5. The network as claimed in claim 1, wherein the fastening member is a screw and downward extending through the cone-shaped nets and the washers.

6. The network as claimed in claim 2, wherein the fastening member is a screw and downward extending through the cone-shaped nets and the washers.

7. The network as claimed in claim 5 further comprising a collector mounted on a free end of the fastening member for receiving congealed oil-smoke.

8. The network as claimed in claim 6 further comprising a collector mounted on a free end of the fastening member for receiving congealed oil-smoke.

9. A network for an oil-smoke exhausting device, comprising:

multiple cone-shaped nets separately piled up to one another, each cone-shaped net having a close end and an open end, the close end having a diameter smaller than that of the open end and the open end adapted to be mounted around an inlet of the oil-smoke exhausting device, a flange radially outwardly extending from the open end of each of the cone-shaped nets, the flanges abutting one another;

a washer mounted between each two adjacent nets to form a chamber between each two adjacent nets, the washer aligning with the close end of each of the cone-shaped nets;

a frame mounted around the open ends of each of the cone-shaped nets to combine the flanges securely abutting one another;

a cone-shaped rack adapted to be mounted under an inlet of the oil-smoke exhausting device and receiving the multiple cone-shaped nets; and a fastening member securely extending through the cone-shaped nets, the washers and the rack to hold the washers in place;

whereby the multiple cone-shaped nets are provide to adhere oil-smoke particle during cooking.

10. The network as claimed in claim 9, wherein the frame comprises an annular groove defined in the frame to securely receive the flanges of each of the cone-shaped nets.

11. The network as claimed in claim 9, wherein the rack comprises two ears radially outwardly extending from the frame and diametrically corresponding to each other such that the network is adapted to be mounted under the inlet of the oil-smoke exhausting device by screws.

12. The network as claimed in claim 10, wherein the rack comprises two ears radially outwardly extending from the frame and diametrically corresponding to each other such that the network is adapted to be mounted under the inlet of the oil-smoke exhausting device by screws.

13. The network as claimed in claim 9, wherein the fastening member is a screw and downward extending through the cone-shaped nets and the washers.

14. The network as claimed in claim 10, wherein the fastening member is a screw and downward extending through the cone-shaped nets and the washers.

15. The network as claimed in claim 13 further comprising a collector mounted on a free end of the fastening member for receiving congealed oil-smoke.

16. The network as claimed in claim 14 further comprising a collector mounted on a free end of the fastening member for receiving congealed oil-smoke.

* * * * *